United States Patent
Chi

(10) Patent No.: US 10,831,034 B2
(45) Date of Patent: Nov. 10, 2020

(54) ILLUMINATION DEVICE

(71) Applicant: HIMAX TECHNOLOGIES LIMITED, Tainan (TW)

(72) Inventor: Cheng-Hung Chi, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/252,544

(22) Filed: Jan. 18, 2019

(65) Prior Publication Data
US 2020/0233224 A1 Jul. 23, 2020

(51) Int. Cl.
G02B 27/09 (2006.01)
F21Y 115/30 (2016.01)
F21V 5/00 (2018.01)
G02B 27/00 (2006.01)

(52) U.S. Cl.
CPC .......... *G02B 27/0944* (2013.01); *F21V 5/007* (2013.01); *F21Y 2115/30* (2016.08); *G02B 27/0037* (2013.01)

(58) Field of Classification Search
CPC . F21V 5/007; G02B 27/0037; G02B 27/0043; G02B 27/0944
See application file for complete search history.

(56) References Cited

U.S. PATENT DOCUMENTS

| | | | |
|---|---|---|---|
| 4,410,237 A * | 10/1983 | Veldkamp | G02B 5/1871 342/22 |
| 5,513,201 A | 4/1996 | Yamaguchi et al. | |
| 9,273,846 B1 * | 3/2016 | Rossi | G02B 3/005 |
| 2002/0126479 A1 * | 9/2002 | Zhai | G02B 5/32 362/244 |
| 2010/0202725 A1 * | 8/2010 | Popovich | G02B 27/48 385/10 |
| 2010/0214660 A1 * | 8/2010 | Miao | G02B 27/0905 359/571 |
| 2013/0208273 A1 * | 8/2013 | Dominguez-Caballero | G01J 3/0205 356/311 |
| 2013/0271970 A1 * | 10/2013 | Childers | F21V 5/045 362/218 |
| 2014/0043813 A1 * | 2/2014 | Dube | F21V 5/04 362/244 |
| 2017/0115497 A1 * | 4/2017 | Chen | F21V 5/008 |
| 2018/0259155 A1 | 9/2018 | Di Trapani | |

(Continued)

FOREIGN PATENT DOCUMENTS

| JP | 2010504596 | 2/2010 |
|---|---|---|
| TW | 200728889 | 8/2007 |
| TW | M519254 | 3/2016 |

OTHER PUBLICATIONS

"Office Action of Taiwan Counterpart Application," dated Jul. 18, 2019, p. 1-p. 4.

*Primary Examiner* — Zheng Song
(74) *Attorney, Agent, or Firm* — JCIPRNET

(57) ABSTRACT

An illumination device including a light source array and a diffractive optical element (DOE) is provided. The light source array includes a plurality of point light sources arranged in an array. The diffractive optical element includes a plurality of diffractive areas respectively aligned with the point light sources. The diffractive areas respectively diffract lights from the point light sources to an illuminated object, so as to superimpose the lights to form a uniform bright area on the illuminated object.

7 Claims, 6 Drawing Sheets

(56) References Cited

U.S. PATENT DOCUMENTS

2018/0267214 A1\* 9/2018 Rossi ................... G02B 3/0056
2019/0273906 A1\* 9/2019 Xiao ..................... G02B 27/48

\* cited by examiner

ILLUMINATION DEVICE

BACKGROUND OF THE INVENTION

1. Field of the Invention

The invention generally relates to an optical device and, in particular, to an illumination device.

2. Description of Related Art

Illuminators are widely used in various regions. In many circumstances, a light source is needed to illuminate a target to be seen or photographed, which can be accomplished by an illuminator. In some photographing occasions, uniform illumination is required to improve the quality of images, and enough brightness is also needed.

Adopting a laser emitter as a light-emitting device in an illuminator can increase the brightness, but the beam emitted by a laser emitter generally has a small divergent angle. A small divergent angle of the beam is easy to reduce the uniformity of illumination. To increase the uniformity of illumination when a light-emitting device with a small divergent angle of a beam is used, various optical components can be adopted to increase the divergent angle. However, using the optical components enlarges the volume of the whole optical system, i.e. the illuminator. Generally, the smaller the divergent angle, the larger the volume of the whole optical system adopting the optical components.

SUMMARY OF THE INVENTION

Accordingly, the invention is directed to an illumination device, the structure of which facilitates reducing the volume of the illumination device.

According to an embodiment of the invention, an illumination device including a light source array and a diffractive optical element (DOE) is provided. The light source array includes a plurality of point light sources arranged in an array. The diffractive optical element includes a plurality of diffractive areas respectively aligned with the point light sources. The diffractive areas respectively diffract lights from the point light sources to an illuminated object, so as to superimpose the lights to form a uniform bright area on the illuminated object.

In the illumination device according to the embodiment of the invention, the diffractive areas are respectively aligned with the point light sources, and respectively diffract lights from the point light sources to the illuminated object, so that the interval between DOE and the light source array may be reduced. As a result, the illumination device according to the embodiment of the invention may have smaller volume.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
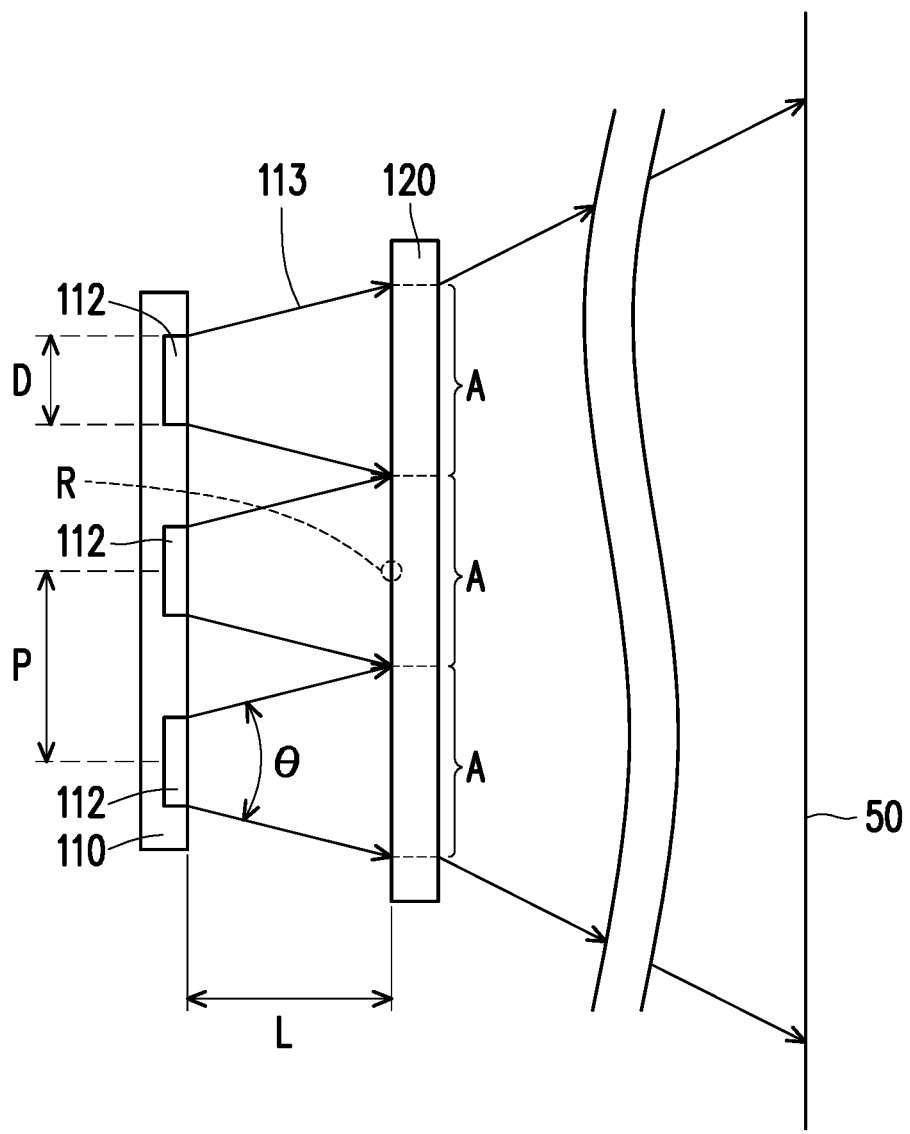
FIG. 1 is a schematic cross-sectional view of an illumination device according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

Figure 2A:
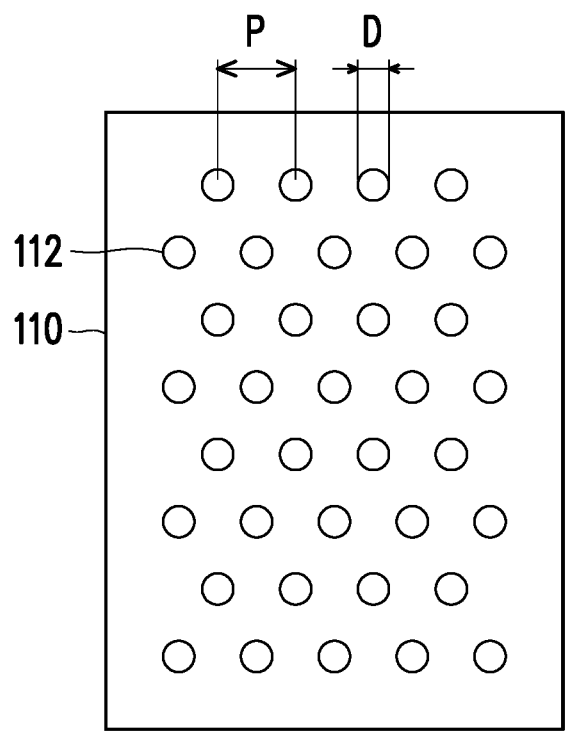
FIG. 2A is a schematic top view of the light source array in FIG. 1.
Figures 2B, 2C:
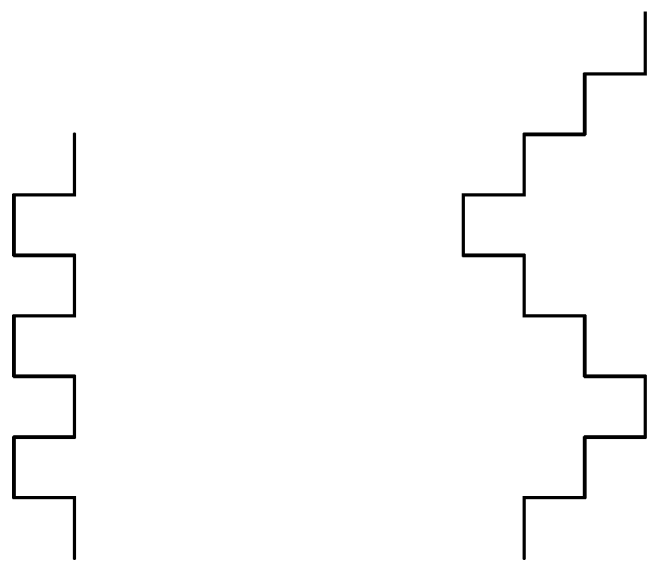
FIGS. 2B and 2C are enlarged views of the region R in FIG. 1 according to two embodiments of the invention.
Figure 3:
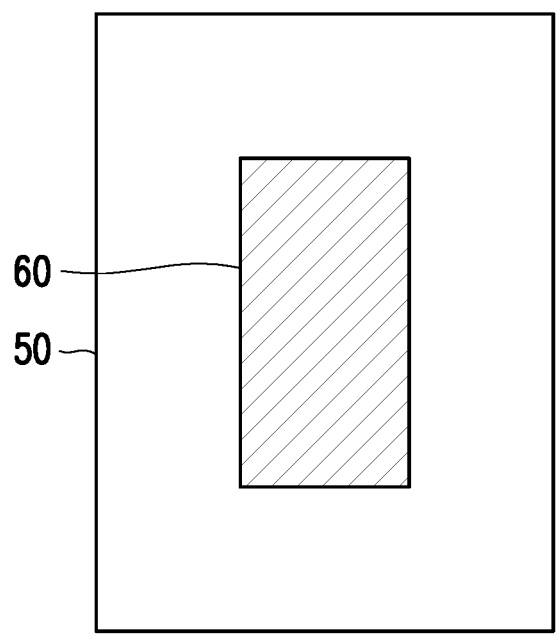
FIG. 3 shows a uniform bright area on an illuminated object which is illuminated by the illumination device in FIG. 1.

FIG. 1 is a schematic cross-sectional view of an illumination device according to an embodiment of the invention. FIG. 2A is a schematic top view of the light source array in FIG. 1. FIGS. 2B and 2C are enlarged views of the region R in FIG. 1 according to two embodiments of the invention. FIG. 3 shows a uniform bright area on an illuminated object which is illuminated by the illumination device in FIG. 1. Referring to FIGS. 1, 2A-2C, and 3, the illumination device 100 in this embodiment includes a light source array 110 and a diffractive optical element (DOE) 120. The light source array 110 includes a plurality of point light sources 112 arranged in an array. In this embodiment, the light source array 110 is a laser source array. For example, the light source array 110 is a vertical cavity surface emitting laser (VCSEL), and the point light sources 112 are the light output openings of the VCSEL, respectively, as shown in FIG. 2A. However, in other embodiment, the light source array 110 may be a laser diode array, and the point light sources 112 are laser diodes, respectively.

The DOE includes a plurality of diffractive areas A respectively aligned with the point light sources 112. The diffractive areas A respectively diffract lights 113 from the point light sources 112 to an illuminated object 50, so as to superimpose the lights 113 to form a uniform bright area 60 on the illuminated object 50. In this embodiment, light spots on the illuminated object 50 formed by a light emitted from each of the point light sources and diffracted by a corresponding diffractive area A are dispersed over the entire uniform bright area 60 but have dark areas among the light spots. Moreover, light spots formed by lights emitted from all the point light sources and respectively diffracted by the corresponding diffractive areas A are superimposed to form the uniform bright area 60.

In this embodiment, the illuminated object 50 is, for example, a wall. However, in other embodiments, the illuminated object 50 may be a human face, an object to be photographed, or any other object to be illuminated. In this embodiment, the uniform bright area 60 is rectangular-shaped. However, in other embodiments, the uniform bright area 60 may be in any other shape. The shape of the uniform bright area 60 may be determined by the design of the DOE 120.

In the illumination device 100 according to the embodiment of the invention, the diffractive areas A are respectively aligned with the point light sources 112, and respectively diffract lights 113 from the point light sources 112 to the illuminated object 50, so that the interval L between DOE 120 and the light source array 110 may be reduced. As a result, the illumination device 100 according to the embodiment of the invention may have smaller volume. In this embodiment, the interval L between DOE 120 and the light source array 110 is less than or equal to 0.1 millimeters (mm), and is, for example, 0.05 mm.

In an illumination device according to a comparative embodiment, a DOE does not have individual diffractive areas as those in the embodiment of FIG. 1, and the interval between the DOE and a light source array is larger than that of the embodiment of FIG. 1 so that the areas on the DOE respectively illuminated by the divergent lights emitted from the point light sources of the light source array overlap with each other in a large degree. Therefore, in the comparative embodiment, the DOE diffracts all the lights together to the illuminated object. In the comparative embodiment, the DOE is designed in the situation of assuming that the light emitted by the point light source is a parallel beam, i.e. a plane wave. However, in fact, the light emitted by the point light source has a small divergent angle, so that the bright area on the illuminated object formed by the illumination device according to the comparative embodiment will blur and be not the same as the original design, for example, the field of view (FOV) of the illumination device will not be the same as the original design.

In contrast, in the illumination device 100 according to the embodiment of FIG. 1, the light 113 having a divergent angle θ is taken into consideration, the diffractive areas A are respectively aligned with the point light sources 112, and respectively diffract lights 113 from the point light sources 112 to the illuminated object 50, so that the uniform bright area 60 on the illuminated object 50 is the same or similar to the original design, and the FOV of the illumination device 100 is predictable.

In this embodiment, the surface of the DOE 120 may have at least two height levels so that the DOE 120 can diffract the lights 113. For example, in FIG. 2B, the surface of the DOE 120 has two height levels, and in FIG. 2C, the surface of the DOE has four height levels.

Figure 4:
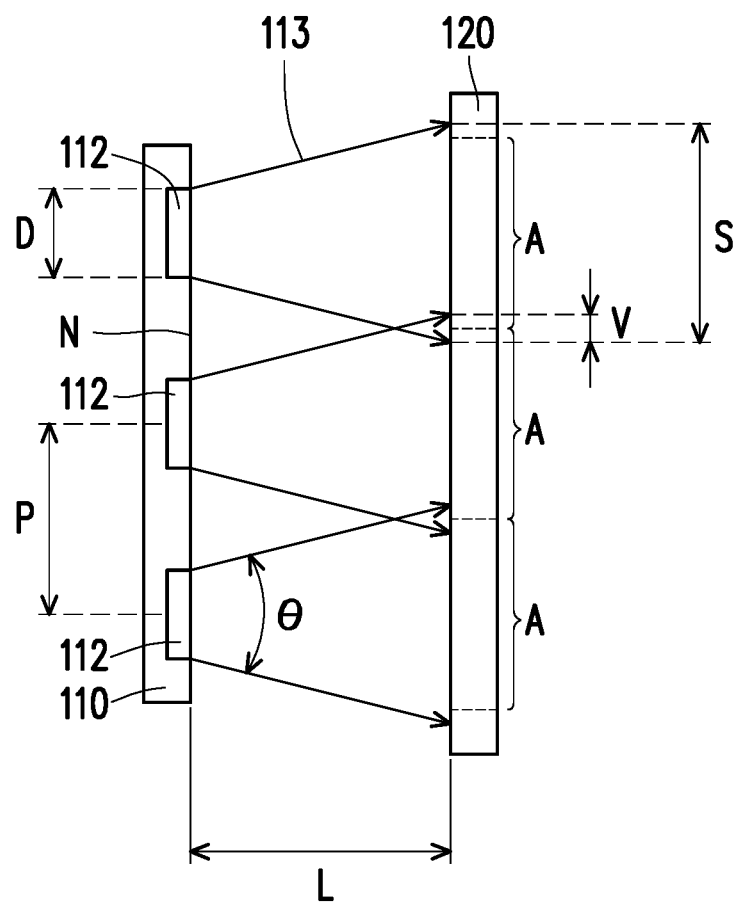
FIG. 4 is a schematic cross-sectional view of an illumination device according to another embodiment of the invention.

FIG. 4 is a schematic cross-sectional view of an illumination device according to another embodiment of the invention. Referring to FIG. 4, the illumination device 100a in this embodiment is similar to the illumination device 100 in FIG. 1, and the main difference therebetween is as follows. In FIG. 1, the illuminated areas on the DOE 120 formed by two adjacent lights 113 do not overlap with each other. However, the interval L between the DOE 120 and the light source array 110 in FIG. 4 is larger than the interval L between the DOE 120 and the light source array 110 in FIG. 1, so that two areas respectively illuminated by two adjacent lights 113 respectively emitted by two adjacent point light sources 112 along a reference line N connecting the two adjacent point light sources 112 overlap with each other. In FIG. 4, V is an overlap width of the two areas on the DOE respectively illuminated by two adjacent lights 113 respectively emitted by two adjacent point light sources 112 along the reference line N connecting the two adjacent point light sources 112.

In the embodiments of FIGS. 1 and 4, the illumination device 100 or 100a satisfies L=[E·P/2+(P/2−D/2)]/tan(θ/2) and 0≤E≤0.5, where L is the interval between the light source array 110 and the DOE 120, E is a coefficient, P is a pitch of the point light sources 112, D is an outer diameter of each of the point light sources 112, and θ is a divergent angle of each of the lights 113. When the illumination device 100 or 100a satisfies 0≤E≤0.5, the uniform bright area 60 on the illuminated object 50 is the same or similar to the original design, and the FOV of the illumination device 100 is more predictable. In the embodiments of FIGS. 1 and 4, the illumination device 100 or 100a satisfies E=V/P. In the embodiment of FIG. 1, V=0 and E=0. Besides, in the embodiment of FIG. 4, V is greater than 0, and 0<E≤0.5. In an embodiment, 0<E≤0.3. Moreover, in FIGS. 1 and 4, the point light sources 112 are disposed at equal intervals, but the invention is not limited thereto.

Figure 5:
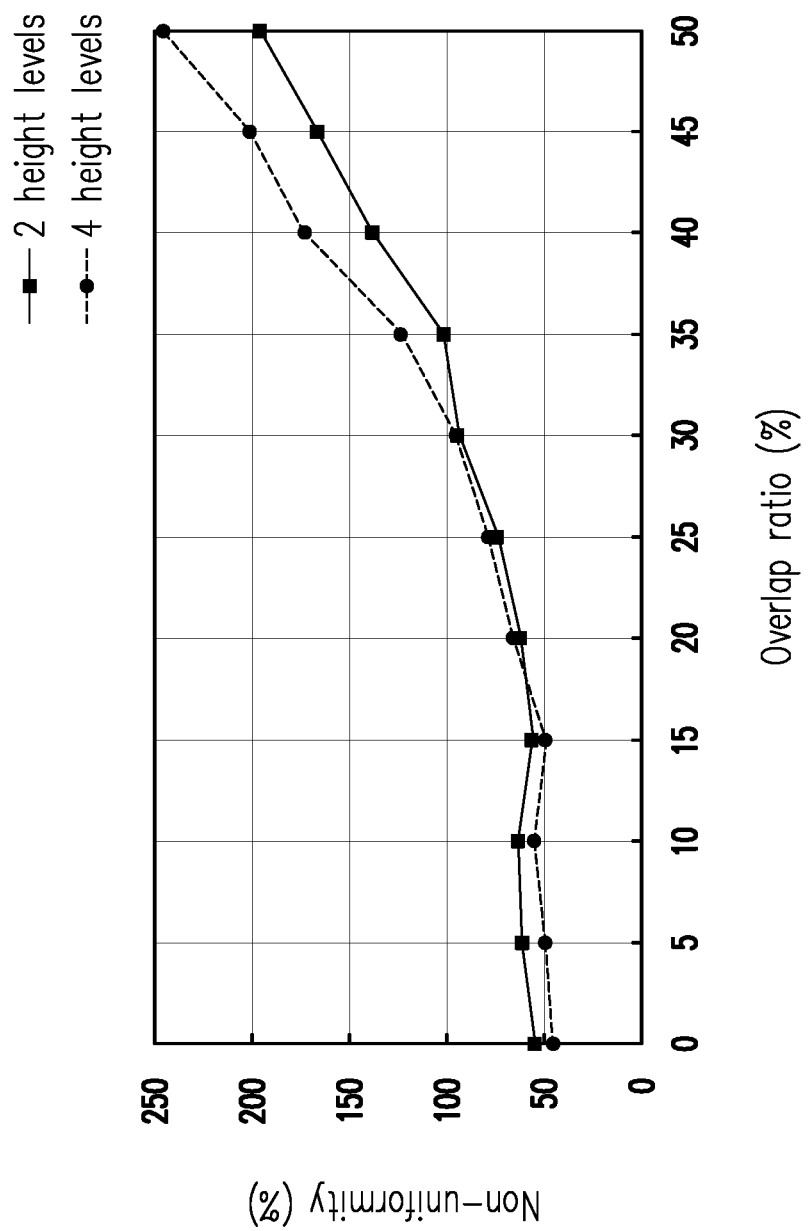
FIG. 5 is a broken line graph of non-uniformity of the uniform bright area on the illuminated object vs. the overlap ratio of the illumination device according to the embodiments of FIGS. 1 and 4.
Figure 6:
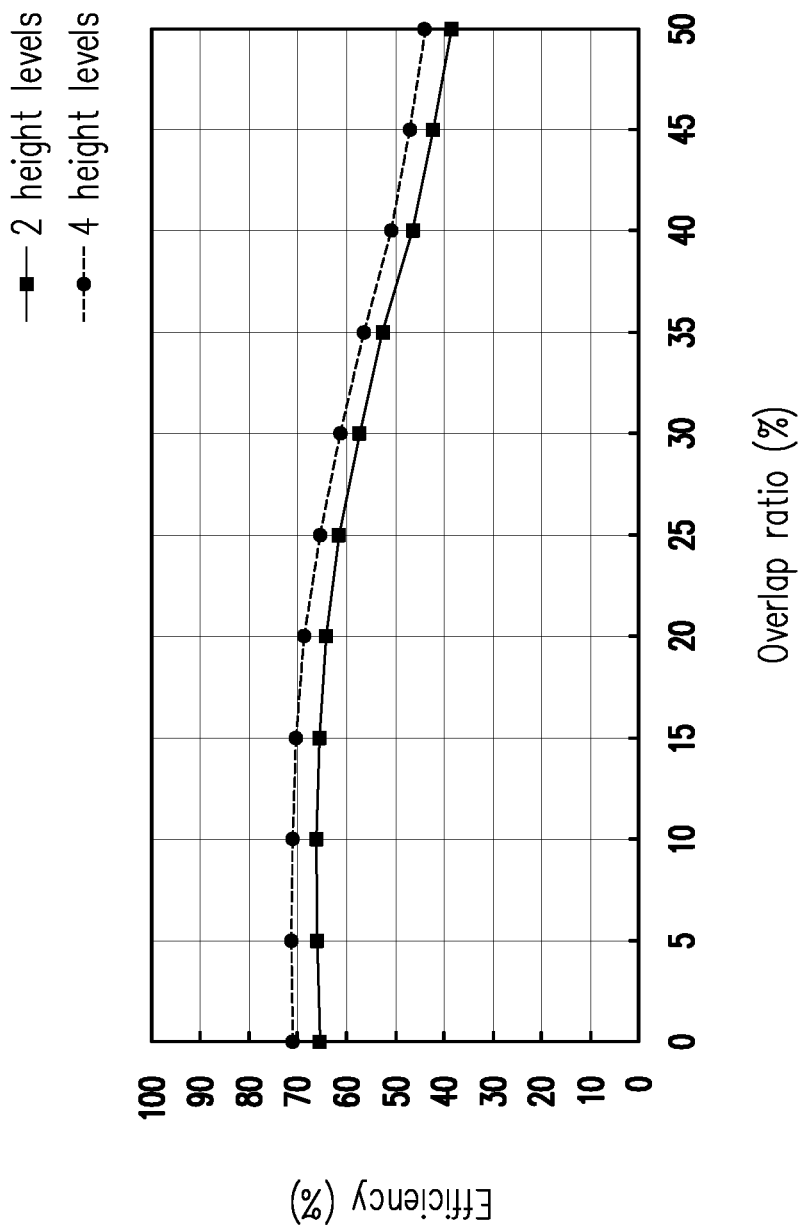
FIG. 6 is a broken line graph of the efficiency vs. the overlap ratio of the illumination device according to the embodiments of FIGS. 1 and 4.

FIG. 5 is a broken line graph of non-uniformity of the uniform bright area on the illuminated object vs. the overlap ratio of the illumination device according to the embodiments of FIGS. 1 and 4. FIG. 6 is a broken line graph of the efficiency vs. the overlap ratio of the illumination device according to the embodiments of FIGS. 1 and 4. Referring to FIGS. 1, 4, 5, and 6, the broken line denoted by 2 height levels corresponds to the illumination device 100 or 100a having the DOE 120 with the surface having two height levels as shown in FIG. 2B, and the broken line denoted by 4 height levels corresponds to the illumination device 100 or 100a having the DOE 120 with the surface having four height levels as shown in FIG. 2C. The overlap ratio in FIGS. 5 and 6 is defined as the overlap width V divided by a expanded width S of the area on the DOE 120 illuminated by the light 113 emitted by each of the two adjacent point light sources 112 along the reference line N connecting the two adjacent point light sources 112, i.e. the overlap ratio is equal to V/S. The non-uniformity in FIG. 5 is defined as $(I_{max}-I_{min})/I_{mean}$, wherein $I_{max}$ is the maximum light intensity in the uniform bright area 60, $I_{min}$ is the minimum light intensity in the uniform bright area 60, and $I_{mean}$ is the average light intensity in the uniform bright area 60. The efficiency in FIG. 6 is defined as the light energy within the uniform bright area 60 divided by the whole light energy outputted from the illumination device 100 or 100a. It can be learned from FIG. 5 that when the overlap ratio is less than or equal to 15%, the uniform bright area 60 has high light uniformity. Moreover, it can be learned from FIG. 6 that when the overlap ratio is less than or equal to 20%, the illumination device 100 or 100a has high efficiency. It can also be learned from FIGS. 5 and 6 that when the overlap ratio is less than 30%, the light uniformity and the efficiency are good.

In the illumination device according to the embodiment of the invention, the diffractive areas are respectively aligned with the point light sources, and respectively diffract lights from the point light sources to the illuminated object, so that the interval between DOE and the light source array may be reduced. As a result, the illumination device according to the embodiment of the invention may have smaller volume.

It will be apparent to those skilled in the art that various modifications and variations can be made to the structure of the invention without departing from the scope or spirit of the invention. In view of the foregoing, it is intended that the invention covers modifications and variations of this invention provided they fall within the scope of the following claims and their equivalents.

What is claimed is:

1. An illumination device comprising:
    a light source array comprising a plurality of point light sources arranged in an array; and
    a diffractive optical element having at least two height levels and comprising a plurality of diffractive areas respectively aligned with the point light sources, wherein the diffractive areas respectively diffract lights from the point light sources to an illuminated object, so as to superimpose the lights to form a uniform bright area on the illuminated object,
wherein the illumination device satisfies $L=[E \cdot P/2+(P/2-D/2)]/\tan(\theta/2)$ and $0 \leq E \leq 0.5$, where L is an interval between the light source array and the diffractive optical element, E is a coefficient, P is a pitch of the point light sources, D is an outer diameter of each of the point light sources, and $\theta$ is a divergent angle of each of the lights.

2. The illumination device according to claim 1, wherein the light source array is a laser source array.

3. The illumination device according to claim 2, wherein the light source array is a vertical cavity surface emitting laser.

4. The illumination device according to claim 1, wherein $E=V/P$, where V is an overlap width of two areas respectively illuminated by two adjacent lights respectively emitted by two adjacent point light sources along a reference line connecting the two adjacent point light sources.

5. The illumination device according to claim 1, wherein the illumination device satisfies $0 \leq V/P \leq 0.5$, where V is an overlap width of two areas on the diffractive optical element respectively illuminated by two adjacent lights respectively emitted by two adjacent point light sources along a reference line connecting the two adjacent point light sources, and P is a pitch of the point light sources.

6. The illumination device according to claim 1, wherein an interval between the light source array and the diffractive optical element is less than or equal to 0.1 millimeters.

7. The illumination device according to claim 1, wherein the point light sources are laser diodes.

* * * * *